June 10, 1969     G. T. KEAHL     3,449,050
SPECTROPHOTOMETER

Filed April 29, 1965     Sheet 1 of 2

INVENTOR.
GERALD T. KEAHL
BY
ATTORNEY

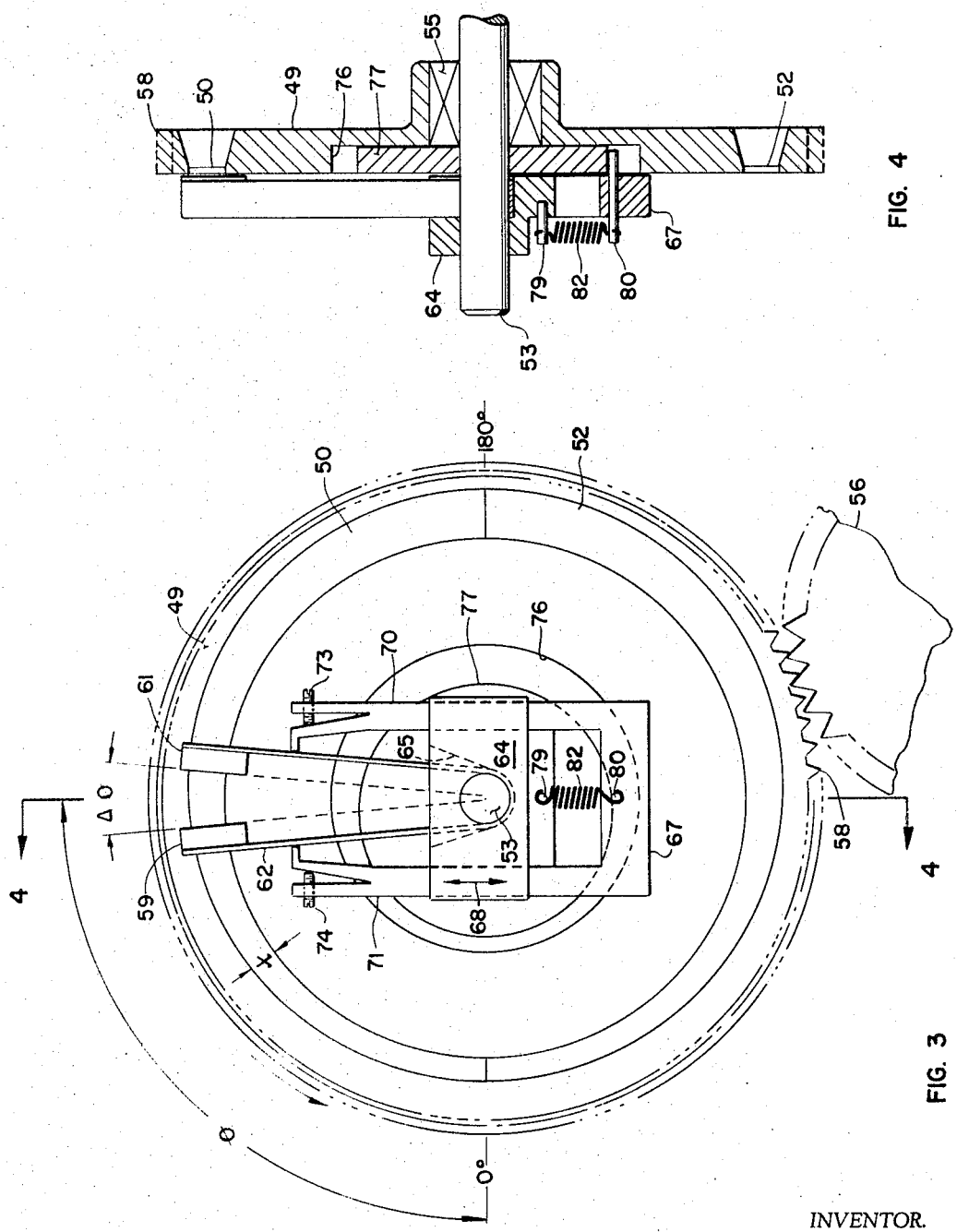

United States Patent Office 3,449,050
Patented June 10, 1969

3,449,050
SPECTROPHOTOMETER
Gerald T. Keahl, Fullerton, Calif., assignor to Beckman Instruments, Inc., a corporation of California
Filed Apr. 29, 1965, Ser. No. 451,859
Int. Cl. G01j *3/42, 3/12*
U.S. Cl. 356—89                                20 Claims

ABSTRACT OF THE DISCLOSURE

There is disclosed an optical analyzer in which the photometer section is constructed of four identical mirrors and two identical beam splitting prisms arranged in such a manner that source images at unity magnification are present in the sample and reference beam path and in the recombined common path and which utilizes a monochromator constructed of a variable interference filter with linear varying wavelength transmission characteristics and a variable slit, the height of the filter section being varied in such a manner as to compensate for variations in background energy as a function of wavelength.

---

This invention relates to optical analyzers such as spectrophotometers and more particularly to an optical analyzer having a simplified optical arrangement and wavelength isolation means. Although the invention will be discussed in connection with an optical analyzer of the double beam, optical null type, it is equally applicable to optical analyzers of the ratio recording type and certain of the features of this invention are applicable to single beam analyzers.

Current commercial spectrophotometers found in general use, particularly for the infrared region, are generally complex, costly to manufacture and require a high amount of upkeep and maintenance to insure proper performance. Many of the instruments require moving optical parts and, because of the unbalanced optical system, mirrors of differing focal lengths at various points within the system. Further, most reflecting elements are made adjustable because of the critical focusing requirements of the instrument. Further, infrared spectrophotometers utilizing prism-grating or filter-grating monochromators generally have a large number of reflections in each path, many instruments ranging from 10 to 16 reflections. Each reflection results in a loss of energy and scattered light.

It is a principal object of this invention to provide an optical analyzer which is simple of construction, low in manufacturing cost and does not require a great deal of upkeep and maintenance to insure proper performance.

Another object is to provide an optical analyzer of the double beam type which has a minimum number of reflections in each path, has no moving optical parts, utilizes a minimum number of different elements and provides for maximum energy transfer through the system.

A further object is to provide an optical analyzer of the double beam type wherein the sample and reference beams and the location of source and slit image in the sample and reference compartments are balanced allowing maximum compensation in the reference beam when the sample affects sample beam area and allows the sampling to be done at the smallest cross section of the sample beam thereby minimizing sample size.

Still another object of the present invention is to provide an optical analyzer of the double beam type which provides balanced sample and reference beam paths, has a minimum number of optical reflections in each path and no moving optical parts, utilizes unity magnification for all focusing optics other than for the detector thereby increasing optical tolerance, which is small in size, simple in operation and low in manufacturing cost.

A further object of the present invention is to provide an optical analyzer of the double beam type utilizing a circular variable interference filter as the monochromator thereby greatly reducing the size and complexity of the system and in which maximum energy is obtained from the monochromator while maintaining constant resolution when expressed as a percentage of wavelength.

Still another object is the provision of an optical analyzer of the double beam type utilizing a circular variable interference filter monochromator having a variable slit mechanism controlled in a manner to obtain maximum energy at constant resolution when expressed as a percentage of wavelength and providing means for compensating for variations in source intensity as a function of wavelength.

A further object is to provide a variable interference filter monochromator for use in an optical analyzer which provides for compensation of source energy as a function of wavelength and wherein maximum energy is obtained while maintaining constant resolution when expressed as a percentage of wavelength.

Yet another object is the provision of an optical system for use in an optical analyzer which provides for the transfer of radiant energy from a source to a monochromator and in which the source is reimaged in the monochromator at unity magnification, which requires a minimum number of different parts, which provides intermediate source images at unity magnification for sampling purposes, which is low in manufacturing cost, simple in construction and compact in size.

Other objects and novel combinations and arrangements of parts and many of the attendant advantages of this invention will become more readily apparent to those skilled in the art as the same becomes better understood by reference to the following detailed description when considered in connection with the accompanying drawings and wherein:

FIG. 3 is a plan view of a circular variable interference filter monochromator constructed according to the teachings of this invention;

FIG. 4 is a sectional view of the monochromator taken along lines 4—4 of FIG. 3;

Figure 1:
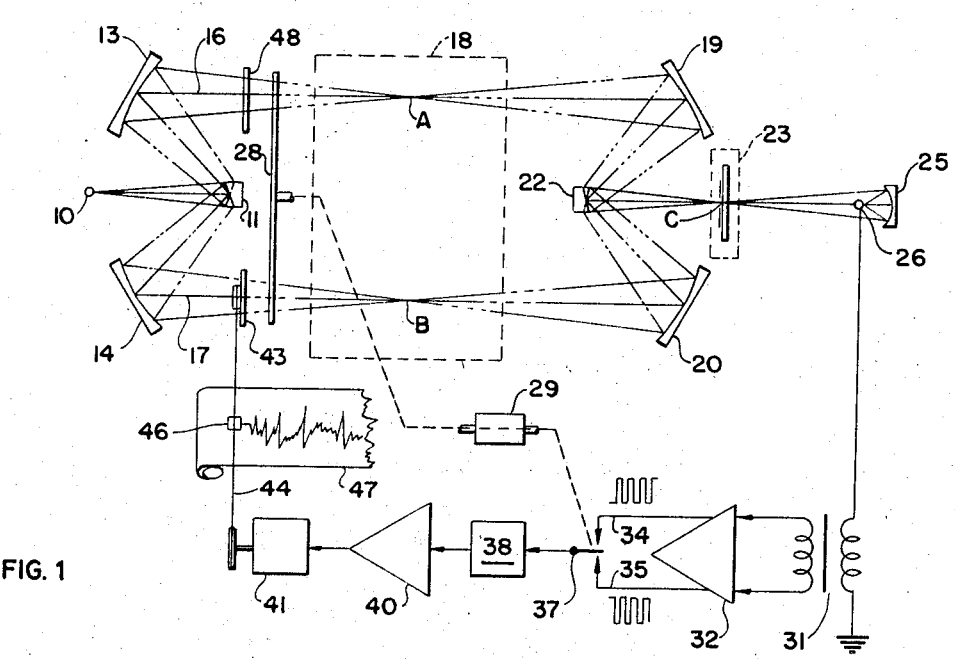
FIG. 1 is a preferred embodiment of an optical analyzer of the double beam, optical null type constructed according to the teachings of this invention.

Referring now to the drawings and more particularly to FIG. 1 thereof, radiation in a common beam path from source 10 is divided by a beam splitter 11 and directed by fixed mirrors 13 and 14 along a sample beam path 16 and a reference beam path 17 respectively through sampling area 18. Sample and reference beam radiation is directed by fixed mirrors 19 and 20 to a beam recombiner 22. Beam recombiner 22 directs the beams through a monochromator 23 to a fixed mirror 25 which focuses the radiation onto a radiant energy detector 26.

A beam chopper 28 which may be a blade of any opaque material, such, for example, as steel, is driven by motor 29 at any suitable speed such as 3⅓ r.p.s. to alternately interrupt the reference and sample beams and provide a modulating function as is well known to those skilled in the art. Chopper 28 may be a semicircle or provided with any number of evenly spaced blade areas and in the practical embodiment constructed by applicant, constituted three blades of 60° segments separated by 60° open sectors. Thus, reference and sample beam pulses time share the common path between beam recombiner 22 and detector 26 and alternately impinge upon the detector at the rate of 10 c.p.s.

Beam splitter 11 and beam recombiner 22 each comprise a pair of prisms aluminized on the hypotenuse and used as first surface mirrors. Each of the prisms are identical and are utilized in place of standard type mirrors to eliminate machining of angles but it should be understood that any flat reflecting surface could be utilized in place of these prisms.

If $f_1$ the effective focal length of mirrors 13 and 14 and if source 10 is located a distance $2f_1$ from these mirrors with beam splitter 11 located at the mid point of $f_1$, mirrors 13 and 14 will form, respectively, at A and B images of source 10 at unity magnification. The distance from mirrors 13 and 14 to their respective image points A and B is equal to twice the effective focal length of the mirrors or $2f_1$. Since the prisms of beam splitter 11 are located at the focal length $f_1$ of mirrors 13 and 14, the images of the prism apertures formed thereby are collimated by mirrors 13 and 14 in the space between mirrors 13 and 19 and mirrors 14 and 20.

Mirrors 19 and 20 likewise have a common effective focal length $f_2$ and are located a distance $2f_2$ from images A and B. If beam recombiner 22 is located a distance $f_2$ from mirrors 19 and 20 source 10 will be re-imaged at C at a distance $f_2$ from beam recombiner 22 and at unity magnification. Because of the symmetry of the optical system on each side of the image place of images A and B the image of beam splitter 11 is formed on beam recombiner 22 by mirrors 19 and 20. The images of the prism apertures of beam splitter 11 on the conjugate prisms of beam recombiner 22 are at unity magnification.

It will be apparent that radiation from the upper prism of beam splitter 11 is transferred by mirrors 14 and 20 to the lower prism of beam recombiner 22. Likewise, radiation from the lower prism of beam splitter 11 is transferred to the upper prism of beam recombiner 22. Since mirrors 13 and 14 and mirrors 19 and 20 have common focal lengths, these pairs of mirrors may be made of identical construtcion and mirrors 13 and 20 positioned below mirrors 14 and 19. On the other hand, to avoid this unbalanced positioning, the mirrors may be made larger than the split beam. Thus, the lower half of mirrors 13 and 20 is utilized while the upper half of mirrors 14 and 19 is utilized. These mirrors may be then mounted on a common plane.

The foregoing optical system has the advantage of transferring the image of source 10 to point C at unity magnification while providing the intermediate images A and B, also at unity magnification, in the sampling area 18. The system also has the advantage of transferring the prism apertures of beam splitter 11 at unity magnification to their conjugate prisms of beam recombiner 22. By utilizing a common focal length for mirrors 13 and 14 and for mirrors 19 and 20 and a single prism having an aluminized hypotenuse for the prisms of beam splitter 11 and beam recombiner 22, construction cost of the analyzer is greatly reduced. The balanced optical paths in both sample and reference beams with a minimum number of reflections in each path and the location of intermediate images A and B in the sampling area provides for maximum energy transfer through the system with a minimum of stray or scattered radiation, allows a maximum ability to compensate the reference beam when the sample affects beam area and allows the sampling to be done at the smallest beam cross-sectional area thereby requiring a minimum sample size. A further advantage is that by the utilization of unity magnification image transfer on all focusing optics, other than mirror 25 which focuses the radiation onto detector 26, optical tolerances in the positioning of the optical elements are increased thereby eliminating critical focusing requirements. It has been found that through the use of a unity magnification image transfer system the optical tolerance is increased to such an extent that mirrors 13, 14, 19 and 20, beam splitter 11 and beam recombiner 22 need not be made adjustable as is common in current commercial instruments.

The optical system may further be simplified by making the focal lentgh $f_1$ of mirrors 13 and 14 equal to the focal length $f_2$ of mirrors 19 and 20, as is illustrated in FIG. 1. In this manner, the optical system is completely symmetrical and requires only mirrors of a common focal length $f$ for mirrors 13, 14, 19 and 20 thus even further reducing the cost of manufacture. Further, the system is made more compact and retains each of the advantages hereinbefore set forth.

As has been hereinbefore pointed out alternate reference and sample radiation beam pulses, after wavelength selection in monochromator 23, are focused on detector 26 by mirror 25. Detector 26 may be of any suitable type and provides an electrical output signal proportional to the instantaneous incident radiation. As is well known, the output of detector 26 will have an A.C. component having an amplitude and phase that varies as a function of the difference in the energy in the reference beam path and the energy in the sample beam path. The A.C. component is coupled by transformer 31 to the input of amplifier 32 having a phase splitter as its output stage. Accordingly, an A.C. signal having an amplitude and phase that varies as a function of the difference in the energy in the reference and sample beam paths appears on output line 34 of amplifier 32 and a signal of like magnitude but of opposite phase appears on output line 35. The output of amplifier 32 is demodulated by demodulator 37 driven in synchronism with chopper 28 by motor 29 and passed by filter 38 to provide a D.C. signal having an amplitude and polarity that varies as a function of the difference in energy in the reference and sample beam paths. The output of filter 38 is applied to servo amplifier 40 utilized to drive servo motor 41.

An optical attenuator 43 positioned in the reference beam path 17 is coupled to servo 41 by drive cable 44. The output of amplifier 40 drives servo motor 41 in such a direction as to reduce the D.C. input signal to zero. As servo 41 rotates, the optical attenuator opens or closes, as the case may be, to balance the reference beam energy with that of the sample beam energy thus reducing the A.C. component of detector 26, and thus the D.C. input to servo amplifier 40, to zero. In a double beam, optical null analyzer of the type herein illustrated the attenuator position is proportional to sample transmittance, i.e., is proportional to the ratio of the intensity of the sample beam to the intensity of the reference beam before attenuation. A pen 46 is attached to drive cable 44 and, if chart 47 is driven in synchronism with the wavelength selection element of the monochromator 23, the resulting record is the transmittance of the sample as a function of wavelength.

Figure 2:
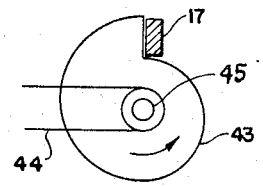
FIG. 2 illustrates a plan view of a radiant energy attenuator for use in the embodiment of FIG. 1.

Attenuator 43 is illustrated in greater detail in FIG. 2. Attenuator 43 may take the form of a solid blade having an outer edge in the form of a spiral. Attenuator 43 is rotated on shaft 45 by drive cable 44 in the direction of the arrow as the transmittance of the sample decreases. As attenuator 43 rotates progressive portions of the reference beam 17 are blocked by the spiral shaped edge. Referring again to FIG. 1 a trimmer 48, having the same configuration as attenuator 43, may be placed in the sample beam path and used to set the 100% line and balance the beams in the absence of a sample. Trimmer 48 is generally rotated manually.

Monochromator 23 is of the type utilizing a circular variable interference filter for wavelength selection and is illustrated in greater detail in FIGS. 3 and 4. The multilayer interference filter is generally produced by a carefully designed stack of layers of alternate high and low refractive index material on a suitable substrate. The layers may be deposited by vacuum evaporation on a suitable substrate material, such, for example, as quartz, sapphire or germanium, depending upon the wavelength region involved. If there is no substantial difference in the refractive index or transmission characteristics of the layers, the difference in the physical characteristics of a filter coated for the transmission of a wavelength $\lambda$ and one coated for the transmission of a wavelength $2\lambda$ is that all layers or coatings in the stack are twice as thick. By applying the coatings to the substrate in such a manner that the thickness of each layer varies linearly along the substrate, the wavelength band transmitted by a small segment of the filter will also vary linearly along the filter. If the coatings are applied to a circular blank of substrate material in such a manner that the thickness of each layer varies linearly as a function of angle, the wavelength band transmitted by the resultant filter will also vary linearly as a function of angle. By proper design, a narrow-band pass filter can be produced on one surface and the higher and lower orders of the transmitted wavelength can be eliminated by deposition on the opposite side of the substrate of a variable wide-band pass filter.

The variable interference filter may be made of the narrow-band pass type and any small segment thereof will have the characteristics of a spike filter. If the wavelength varies linearly along the substrate, the half intensity band width of the spike will be a constant when expressed as a percentage of wavelength. Since the wavelength varies linearly along the filter, the half intensity band width is also a linear function of filter position. In order to obtain maximum resolution and maximum energy with this type of filter it is necessary to provide a pie-shaped slit and to control the geometric slit width or the physical separation of the slit jaws such that they correspond to the half intensity band width.

In FIGS. 3 and 4 there is illustrated a rotatable filter support or wheel 49 having two circular variable interference filter sectors 50 and 52 secured therein in any suitable manner. Filter wheel 49 may be rotated about shaft 53 on bearing 55 in any suitable manner such, for example, as by drive gear 56 engaging gear teeth 58 formed on the periphery of the holder. Drive gear 56 may be driven by a wavelength scan motor in the manner well known in the art.

A pair of slit jaws 59 and 61 are positioned closely adjacent the annulus filter sections such that the extension of the slit forming edges intersect at the center of rotation of filter wheel 49. The slit jaws thus allow radiation to pass through a small pie-shaped sector of the filter determined by the angular spacing $\Delta\theta$ of the slit jaws. Slit jaws 59 and 61 are supported at the extremities of a thin piece of spring material 62 formed in a U-shape and secured against shaft 53 by mounting and guide block 64. Shaft 53 is secured within guide block 64 which has a U-shaped slot 65 formed therein to receive the slit jaw support spring 62. Slot 65 also limits the outer expansion of spring support 62.

Actuator 67 is movable in the plane of the slit openings as indicated by arrow 68 and is movably supported in a channel in guide and support block 64. The extending arms 70 and 71 of actuator 67 are each bifurcated at the ends thereof and the inner forks engage respective sides of spring support 62. Screws 73 and 74 provide a slit width adjustment as more fully described hereinafter.

A circular recess 76 is formed within filter wheel 49 to receive a cam 77 secured to wheel 49 in any suitable manner such as a key, not shown, and accordingly rotates therewith. Pins 79 and 80 are secured respectively within support block 64 and actuator 67. Pin 80 extends through actuator 67 and is spring loaded against cam 77 by spring 82 connected between pins 79 and 80.

As filter wheel 49 is rotated about shaft 53 carrying therewith cam 77, actuator 67 raises and lowers along guide block 64 as pin 80 follows the surface of cam 77. As actuator 67 raises and lowers, the slit opening $\Delta\theta$ defined by slit jaws 59 and 61 increases and decreases since the slit jaw support spring 62 spring loads against arms 70 and 71 of actuator 67. Set screws 73 and 74 within the bifurcated ends of arms 70 and 71 allow for initial adjustment of the slit openings by flexing the inner fork of the bifurcated ends.

Figure 5:
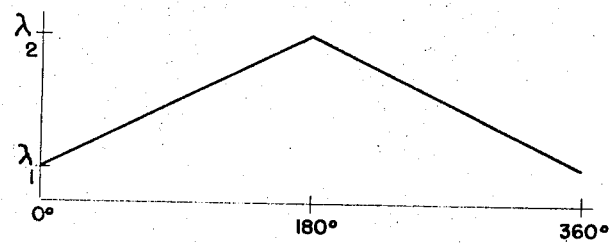
FIG. 5 is a graph of wavelength versus angular position of the filter of FIG. 3.

Referring now to FIG. 5 there is illustrated the wavelength characteristic of interference filter sectors 50 and 52 as a function of angular position of filter wheel 11. If the inner face of filters 50 and 52 is taken as a reference position of 0° and transmits a wavelength $\lambda_1$ it may be seen that as filter wheel 49 is rotated in the direction of the arrow in FIG. 3 through an angle $\theta$ the wavelength varies linearly to $\lambda_2$ as the filter wheel rotates through 180°. In the particular embodiment illustrated the filter sector 52 has been chosen such that the transmission band characteristic of this sector varies from $\lambda_2$ to $\lambda_1$ as the wheel rotates from 180° to 360°. Thus, as the filter wheel is rotated through one revolution the wavelength varies linearly from $\lambda_1$ to $\lambda_2$ and back to $\lambda_1$. The characteristic of FIG. 5 has been idealized in that, in practice there is a slight rounding or nonlinearity at 180° because of the interface of the two filter sectors at this point.

It is obvious that other circular variable interference filter sectors may be utilized to provide different wavelength characteristics as functions of angular position. For example, a singular annular blank may be made such that the transmission band characteristics vary linearly from $\lambda_1$ to $\lambda_2$ as the filter wheel rotates through an angle $\theta$, such as 270°. Alternatively, three filter sectors of substantially the same length may be utilized to cover three separate wavelength regions. For example, if the filter is designed to cover the 2.5 to 14.5$\mu$ region, the three sectors may be designed to cover the 2.5–4.5$\mu$, 4.5–8$\mu$, and 8–14.5$\mu$ regions, respectively. It should be understood that the filter sectors may be separated by a small opaque band and may be designed to provide a slight overlap in wavelength from one sector to the adjacent sector such that a wavelength overlap is provided on the recorder chart to insure continuity of the resulting record.

Figure 6:
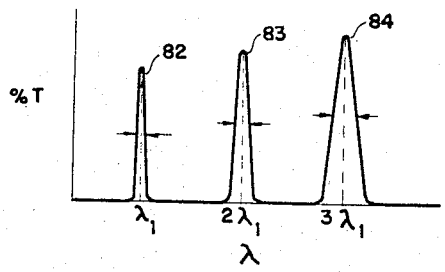
FIG. 6 illustrates the transmission bandpass characteristics of the filter at three angular positions.

Referring now to FIG. 6 there is illustrated at three different positions the transmission band characteristics of a sector $\Delta\theta$ of a circular variable interference filter which has been designed to have a linear change in wavelength as a function of angle. Curve 82 illustrates the transmission band characteristics of the filter at $\lambda_1$ and the half intensity bandwidth is indicated by the arrows. If the filter is now moved to a wavelength equal to $2\lambda_1$ the transmission band characteristic is illustrated by curve 83 and the half intensity band width is twice that at $\lambda_1$. Similarly, at $3\lambda_1$ the half intensity band is three times that of $\lambda_1$ as illustrated by curve 84. Specifically, if the filter is designed to cover the region from 2.5 to 14.5$\mu$ and has a resolution of 1% of the wavelength, the half intensity band width at 2.5$\mu$ will be 0.025$\mu$. At a wavelength of 5$\mu$ the half intensity band width or resolution will be 0.050$\mu$ and at 7.5$\mu$ the resolution will be 0.075$\mu$. In order to maintain maximum energy without loss of resolution it is necessary to maintain the geometric width of the slit $\Delta\theta$ in correspondence with the half intensity band width. Since the resolution changes linearly as a function of angle, although it is constant when expressed as a percentage of wavelength, it is necessary to program the slit opening $\Delta\theta$ to correspond to this change. By appropriately cutting the surface of cam 77 the geometric width of the slit $\Delta\theta$ may be made to correspond to the spectral slit width or half intensity band width of the filter at any wavelength.

It should be understood that when a monochromator of the interference filter type is utilized, the system is most advantageously arranged such that the narrow band pass side of the substrate is located on the source side of the system and the reimage point C of the source is located on the surface of the filter. If a monochromator of the dispersive type is utilized, the source would generally be reimaged at the entrance slit.

It should also be understood that it is not essential to the monochromator described herein that the filter be of circular configuration. A linear interference filter may be constructed in like manner and the advantages and slit requirements set forth herein are equally applicable except that a pie-shaped slit would not be required and the slit would be varied as a function of linear position rather than as a function of angle.

As is well known, the energy from most radiant energy sources varies as a function of wavelength. This source characteristic causes considerable difficulty in optical analyzers of the single beam type since the 100% line must be continually compensated. This problem is not as great in double beam instruments since changes in source intensity are automatically compensated; however, loss of energy may result in changes in servo response time which are generally undesirable. For example, most infrared sources are of the "black body" type and reach an energy peak at approximately 2 to $2.5\mu$ and the energy decreases as longer wavelengths are reached. In an infrared instrument, if the angular slit opening $\Delta\theta$ increases with increasing wavelength at least a partial compensation is obtained for decreased energy from the source at the longer wavelength. However, to obtain a constant amount of source energy which is generally desirable in all servo-type spectrophotometers additional compensation is required. This compensation may be accomplished by varying the filter height $x$. This change in filter height may be determined experimentally and the filter and/or the filter holder machined to provide a suitable function. The filter transmission characteristics are generally reproducible from one filter to the next to a sufficient degree that the height $x$ need not be adjusted from one filter to another but may be cast into the holder. It has been found that this additional compensation may not be required in instruments of the double beam type, particularly in the region from 2.5 to $14.5\mu$ because the change in $\Delta\theta$ of the slit, although not providing perfect compensation, provides sufficient compensation such that change in servo response is not serious.

There has been illustrated and described an optical analyzer of the double beam, optical null type utilizing beam intensity balancing, having a simplified optical arrangement and wavelength isolation means. While a monochromator of the circular variable interference filter type has been illustrated in connection with the analyzer it should be understood that other monochromators may be utilized with the optical system while maintaining certain of the advantages hereinbefore set forth. It should also be understood that the utilization of a separate cam 77 is not essential and the same result may be accomplished by forming a cam track in the material constituting the filter wheel 49.

The optical analyzer constructed in accordance with the teachings of this invention is simple of construction, low in cost, has a minimum number of reflections in each path, has no moving optical parts, utilizes a minimum number of differing elements in the optical system and provides for maximum energy transfer throughout the system. The instrument does not require a great deal of upkeep and maintenance to insure its proper performance.

The principles taught herein may be utilized in optical analyzers of the ratio recording type by the deletion of the sample beam attenuator and the incorporation of ratio recording electronics which are well known in the art. The optical analyzer may be constructed, through the use of appropriate sources, detectors and other optical elements, to operate in any region of the radiation spectrum including the ultraviolet, the visible and the infrared regions. The monochromator taught herein is not limited to use with double beam analyzers and has characteristics which make its use with analyzers of the single beam type particularly advantageous. Obviously, many modifications and variations may be made in the preferred embodiment illustrated herein without departing from the spirit and scope of the invention as defined in the appended claims.

What is claimed is:

1. An optical system for the transfer of radiant energy from a source to a reimaging point at unity magnification comprising:

a source of radiant energy;

a beam splitter interposed in a beam path from said source and directing a portion of the radiation therefrom along first and second paths;

first, second, third and fourth radiant energy reflecting means, said first and second reflecting means respectively positioned in said first and second paths and directing incident radiation to said third and fourth reflecting means while forming intermediate images of said source at unity magnification therebetween;

a beam recombiner positioned to receive radiation from said third and fourth reflecting means and directing said radiation along a common path, the focal length of said reflecting means being selected such that said source is reimaged in said common path at unity magnification.

2. An optical system for the transfer of radiant energy from a source to a reimaging point at unity magnification comprising:

a source of radiant energy;

first and second radiant energy reflecting means each having a common focal length;

a beam splitter interposed in a beam path from said source and directing a portion of the radiant energy therefrom to said first and second reflecting means, said beam splitter being located a distance from said source and from each of said first and second reflecting means equal to the focal length of said first and second reflecting means;

third and fourth reflecting means each having a common focal length and positioned to receive radiant energy from said first and second reflecting means;

a beam recombiner positioned to receive radiation from said third and fourth reflecting means and directing said radiation along a common path, said beam recombiner being located at the focal length of said third and fourth reflecting means whereby said source is reimaged between said first and third reflecting means, between said second and fourth reflecting means and in said common path at unity magnification and said beam splitter is reimaged on said beam recombiner.

3. An optical system for the transfer of radiant energy from a source to a reimaging point at unity magnification comprising:

a source of radiant energy;

first, second, third and fourth radiant energy reflecting means each having a common focal length $f$;

a beam splitter interposed in a beam path a distance $f$ from said source and directing a portion of the radiant energy from said source to each of said first and second reflecting means;

said first and second reflecting means being located a distance $f$ from said beam splitter and respectively directing incident radiation to said third and fourth reflecting means;

said third and fourth reflecting means being respectively located a distance $4f$ from said first and second reflecting means;

a beam recombiner positioned to receive radiation from said third and fourth reflecting means and directing said radiation along a common path, said beam recombiner being located a distance $f$ from said third and fourth reflecting means whereby said source is imaged between said first and third reflecting means, and fourth reflecting means and from said filter equal to the focal length of said third and fourth reflecting means whereby said beam splitter is reimaged on said beam recombiner at unity magnification and said source is reimaged at unity magnification on said filter;

means for alternately chopping said reference and sample beam; and means responsive to radiation passed by said monochromator for measuring the ratio of the intensity of said sample beam with respect to said reference beam.

12. The optical analyzer of claim 11 wherein the focal lengths of said first, second, third and fourth radiant energy reflecting means are equal.

13. An optical analyzer of the double beam type comprising:
- a radiation source;
- a sampling area;
- a circular variable interference filter in the form of at least a sector of an annulus, said filter having a linearly varying wavelength transmission characteristic as a function of angular position;
- a variable slit defining means positioned adjacent said filter and defining a beam path through a sector thereof;
- means for varying said slit defining means as a function of angle whereby maximum energy is transmitted by said filter while maintaining substantially constant resolution as a percentage of wavelength;
- means defining reference and sample beam paths from said source through said sampling area and said variable slit defining means to said filter, said means imaging said source at unity magnification on said filter and providing an intermediate source image at unity magnification in each of said beam paths in said sampling area;
- means for alternately chopping said reference and sample beams; and
- means responsive to radiation passed by said filter for measuring the ratio of the intensity of said sample beam with respect to said reference beam.

14. An optical analyzer of the double beam type comprising:
- a radiation source;
- a sampling area;
- a circular variable interference filter in the form of at least a sector of an annulus, said filter having a linearly varying wavelength transmission characteristic as a function of angular position;
- a variable slit defining means positioned adjacent said filter and defining a beam path through a sector thereof;
- means for varying said slit defining means as a function of angle whereby maximum energy is transmitted by said filter while maintaining substantially constant resolution as a percentage of wavelength;
- first and second radiant energy reflecting means having a common focal length;
- a beam splitter interposed in a beam path from said source and directing a portion of the radiant energy therefrom to said first and second reflecting means, said beam splitter being located a distance from said source and from each of said first and second reflecting means equal to the focal length of said first and second reflecting means, said first and second reflecting means directing radiation respectively along reference and sample beam paths through said sampling area and forming intermediate images at unity magnification in each beam in said sampling area;
- third and fourth reflecting means each having a common focal length and positioned to receive radiant energy from said first and second reflecting means, said third and fourth reflecting means being located at a distance equal to twice their focal length from said intermediate images;
- a beam recombiner positioned to receive radiation from said third and fourth reflecting means and directing radiation along a common path through said variable slit defining means to said filter, said beam recombiner being located a distance from said filter and from each of said thrid and fourth reflecting means equal to the focal length of said third and fourth reflecting means whereby said source is imaged on said filter at unity magnification;
- means for alternately chopping radiation passing said reference and sample beam paths; and
- means responsive to radiation passed by said filter for measuring the ratio of the intensity of said sample beam with respect to said reference beam.

15. The optical analyzer of claim 14 wherein the focal length of said first, second, third and fourth radiant energy reflecting means are equal.

16. An optical analyzer of the double beam type comprising:
- a radiation source;
- a sampling area;
- a circular variable interference filter in the form of at least a sector of an annulus, said filter having a linearly varying wavelength transmission characteristic as a function of angular position;
- a variable slit defining means positioned adjacent said filter and defining a beam path through a sector thereof;
- means for varying said slit defining means as a function of angle whereby maximum energy is transmitted by said filter while maintaining substantially constant resolution as a percentage of wavelength;
- first, second, third and fourth radiant energy reflecting means each having a common focal length $f$;
- a beam splitter interposed in a beam path a distance $f$ from said source and having first and second reflecting surfaces respectively lying in one of two intersecting planes which are at an angle to one another, said first reflecting surface directing incident radiation to said first reflecting means and said second reflecting surface directing incident radiation to said second reflecting means;
- said first and second reflecting means being located a distance $f$ from said beam splitter and respectively directing incident radiation along reference and sample beam paths through said sampling area and forming an intermediate image of said source at unity magnification in each of said paths in said sampling area;
- surfaces respectively lying in one of two intersecting planes which are at an angle to one another;
- said third and fourth reflecting means positioned respectively a distance $4f$ from said first and second reflecting means and respectively directing incident radiation to said first and second reflecting surfaces of said beam recombiner;
- said beam recombiner positioned a distance $f$ from said filter and from each of said third and fourth reflecting means and directing radiation therefrom along a common path through said variable slit defining means to said filter whereby said first reflecting surface of said beam splitter is imaged on said first reflecting surface of said beam recombiner at unity magnification, said second reflecting surface of said beam splitter is imaged on said second reflecting surface of said beam recombiner at unity magnification and said source is reimaged at unity magnification on said filter;
- means for alternately chopping radiation passing and reference and sample beam paths; and
- means responsive to radiation passed by said filter for measuring the ratio of the intensity of said sample beam with respect to said reference beam.

17. The optical analyzer of claim 16 wherein said last named means includes attenuator means positioned to selectively attenuate said reference beam to balance the said second and fourth reflecting means and in said common path at unity magnification.

4. An optical system for the transfer of radiant energy from a source through a sampling area and reimaging said source at unity magnification comprising:
a source of radiant energy;
first and second radiant energy reflecting means each having a common focal length $f_1$;
a beam splitter interposed in a beam path a distance $f_1$ from said source and directing substantially half of the radiation in said path from said source to each of said first and second reflecting means;
a sampling area;
said first and second reflecting means being located a distance $f_1$ from said beam splitter and respectively directing incident radiation along different paths through said sampling area and forming intermediate images of said source at unity magnification within said sampling area;
a beam recombiner;
third and fourth radiant energy reflecting means each having a common focal length $f_2$ respectively positioned in said paths and directing said radiation to said beam recombiner, said third and fourth reflecting means being located a distance $f_2$ from said beam recombiner whereby said beam splitter is imaged on the conjugate surfaces of said beam recombiner at unity magnification;
said beam recombiner redirecting radiation from said third and fourth reflecting means along a common path whereby said source is reimaged in said common path at unity magnification.

5. The optical system of claim 4 wherein the focal length $f_1$ of said first and second radiant energy reflecting means and the focal length $f_2$ of said third and fourth radiant energy reflecting means are equal.

6. An optical system for reimaging a source at unity magnification while providing intermediate images of said source at unity magnification in a sampling area comprising:
a source of radiant energy;
first, second, third and fourth radiant energy reflecting means each having a common focal length $f$;
a beam splitter interposed in a beam path a distance $f$ from said source and having first and second reflecting surfaces respectively lying in one of two intersecting planes which are at an angle to one another; said first reflecting surface directing incident radiation to said first reflecting means and said second reflecting surface directing incident radiation to said second reflecting means;
a sampling area;
said first and second reflecting means being located a distance $f$ from said beam splitter and respectively directing incident radiation along different paths through said sampling area and forming intermediate images of said source at unity magnification within said sampling area;
a beam recombiner having first and second reflecting surfaces respectively lying in one of two intersecting planes which are at an angle to one another;
said third and fourth reflecting means positioned respectively a distance $4f$ from said first and second reflecting means and respectively reflecting said radiation to said first and second reflecting surfaces of said beam recombiner;
said beam recombiner positioned a distance $f$ from said third and fourth reflecting means and directing radiation therefrom along a common path whereby said first reflecting surface of said beam splitter is imaged on said first reflecting surface of said beam recombiner at unity magnification, said second surface of said beam splitter is imaged on said second reflecting surface of said beam recombiner at unity magnification and said source is reimaged at unity magnification in said common path.

7. An optical analyzer comprising:
a radiation source;
a sampling area;
a variable interference filter monochromator having a linearly varying wavelength transmission characteristic;
variable slit defining means positioned adjacent said filter and defining a beam path through a sector thereof;
means for varying the opening of said slit defining means as a function of wavelength transmitted by said sector;
means for imaging said source at unity magnification on said filter and providing an intermediate source image at unity magnification in said sampling area; and
means responsive to radiation passed by said monochromator for measuring the intensity thereof.

8. The optical analyzer of claim 7 further including means for varying the height of said sector whereby variations in intensity of said source as a function of wave length may be compensated.

9. An optical analyzer of the double beam type comprising:
a radiation source;
a sampling area;
a variable interference filter monochromator having a linearly varying wavelength transmission characteristic;
means defining reference and sample beam paths from said source through said sampling area to said monochromator, said means imaging said source at unity magnification on said filter and providing an intermediate source image at unity magnification in each of said beam paths in said sampling area;
means for alternately chopping said reference and sample beams; and
means responsive to radiation passed by said monochromator for measuring the ratio of the intensity of said sample beam with respect to said reference beam.

10. The optical analyzer of claim 9 wherein said last named means includes attenuator means positioned to selectively attenuate said reference beam to balance the intensity of said reference beam with respect to said sample beam.

11. An optical analyzer of the double beam type comprising:
a radiation source;
a sampling area;
a variable interference filter monochromator having a linearly varying wavelength transmission characteristic;
first and second radiant energy reflecting means each having a common focal length;
a beam splitter interposed in a beam path from said source and directing radiant energy therefrom to said first and second reflecting means, said beam splitter being located a distance from said source and from said first and second reflecting means equal to the focal length of said first and second reflecting means, said first and second reflecting means directing incident radiation along reference and sample beam paths through said sampling area and forming intermediate images of said source at unity magnification within said sampling area;
third and fourth reflecting means each having a common focal length and positioned to receive radiant energy respectively from said first and second reflecting means;
a beam recombiner positioned to receive radiation from said third and fourth reflecting means and directing said radiation along a common path, said beam recombiner being located at a distance from said third intensity of said reference beam with respect to said sample beam.

18. A monochromator comprising:
a variable interference filter having a linearly varying wavelength transmission characteristic;
slit defining means positioned adjacent said filter and defining a beam path through a sector thereof;
means providing relative motion between said variable interference filter and said slit defining means whereby various wavelengths may be selected;
means for varying the opening of said slit defining means as a function of wavelength transmitted by said sector; and
means for varying the height of said sector whereby maximum energy is transmitted by said monochromator while maintaining substantially constant resolution as a percentage of wavelength and variations in the intensity of a source as a function of wavelength may be compensated.

19. A monochromator comprising:
a circular variable interference filter having a linearly varying wavelength transmission characteristic as a function of angular position;
means for rotating said filter;
slit defining means positioned adjacent said filter and defining a beam path through a sector thereof;
means for varying the opening of said slit defining means as a function of angular position of said filter whereby maximum energy is transmitted by said filter while maintaining substantially constant resolution as a percentage of wavelength;
means varying the height of said sector for compensating variations in source energy as a function of wavelength.

20. A monochromator comprising:
a circular variable interference filter in the form of at least a sector of an annulus, said filter having a linearly varying wavelength transmission characteristic as a function of angular position;
variable slit defining means having a pie-shaped slit aperture positioned so as to define a beam path through a sector of said filter;
means mounting said filter for rotation relative to said slit defining means;
means for varying said slit defining means so as to vary said pie-shaped slit aperture whereby maximum energy is transmitted by said monochromator while maintaining substantially constant resolution as a percentage of wavelength;
means varying the height of said interference filter sector for compensating variations in the intensity of a source as a function of wavelength.

References Cited

UNITED STATES PATENTS 3,022,704  2/1962  Cary.
3,039,353  6/1962  Coates et al.

FOREIGN PATENTS 1,314,569  12/1962  France.
1,371,342  7/1964  France.

RONALD L. WIBERT, *Primary Examiner.*

V. P. McGRAW, *Assistant Examiner.*

U.S. Cl. X.R.
356—95, 97, 99

UNITED STATES PATENT OFFICE
CERTIFICATE OF CORRECTION

Patent No. 3,449,050            June 10, 1969

Gerald T. Keahl

It is certified that error appears in the above identified patent and that said Letters Patent are hereby corrected as shown below:

Column 12, line 6, "thrid" should read -- third --; line 49, before "surfaces" insert -- a beam re-combiner having first and second reflecting --; line 69, "and" should read -- said --.

Signed and sealed this 4th day of November 1969.

(SEAL)
Attest:

Edward M. Fletcher, Jr.            WILLIAM E. SCHUYLER, JR.
Attesting Officer            Commissioner of Patents